United States Patent [19]

Beaulieu et al.

[11] Patent Number: 4,797,124
[45] Date of Patent: Jan. 10, 1989

[54] CONNECTOR BODIES AND ASSEMBLIES

[75] Inventors: Laurence A. J. Beaulieu, Kanata; Alex G. Cristescu, Montreal, both of Canada

[73] Assignee: Northern Telecom Limited, Montreal, Canada

[21] Appl. No.: 18,230

[22] Filed: Feb. 24, 1987

Related U.S. Application Data

[63] Continuation-in-part of Ser. No. 856,518, Apr. 28, 1986, abandoned.

[51] Int. Cl.4 .............................................. H01R 9/24
[52] U.S. Cl. .................................... 439/719; 379/326
[58] Field of Search .............. 439/708, 707, 709, 711, 439/712, 713, 718, 719, 720, 721, 722, 723, 724, 290, 291, 292, 293, 294, 295, 676; 379/325–328

[56] References Cited

U.S. PATENT DOCUMENTS 4,367,908  1/1983  Johnston ............................ 439/676

Primary Examiner—Neil Abrams
Attorney, Agent, or Firm—R. J. Austin

[57] ABSTRACT

A connector body or assembly which provides a modular jack housing for a plurality of plug retainers and plugs. In one arrangement, the body has in addition to the modular jack housing, another body part having two spaced rows of electrical terminals with the terminals of one row electrically connected through the body with terminals of the other row to provide the connector element. One of the rows is connectible by wiring to plug retainers to be mounted in the modular jack housing. In another arrangement, a mounting means on the other body part is provided for mounting part of a mating connector onto the body. This connector part is wired to plug retainers to be mounted in the modular jack housing.

4 Claims, 8 Drawing Sheets

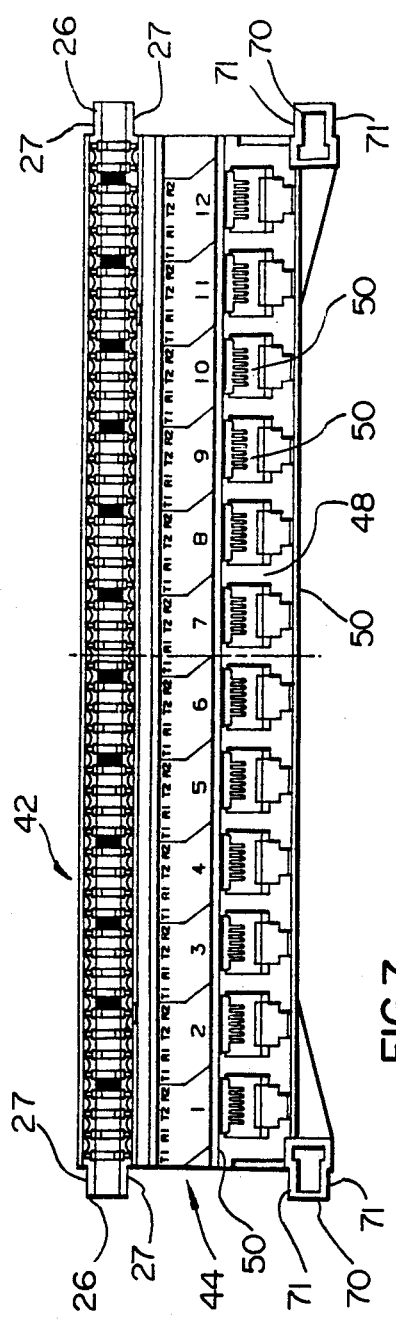
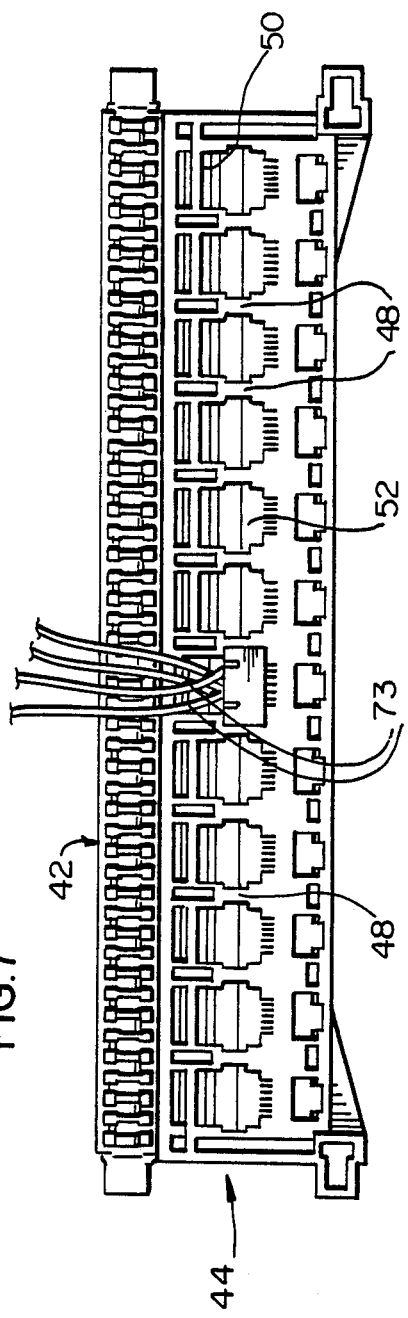
FIG.7
FIG.8

CONNECTOR BODIES AND ASSEMBLIES

This application is a continuation-in-part of Ser. No. 06/856,518, filed Apr. 28, 1986, and now abandoned.

This invention relates to connector bodies and assemblies.

In a telecommunications system, an incoming cable to a customer's premises is connected to a distribution cable for distribution of the electrical wiring to access points and terminals within the premises. The distribution cable may itself be connected to a further cable or to in series or in parallel cables, to assist in the wiring distribution. At each connection location between cables, it is now common practice to use a distribution frame which detachably carries connectors for electrically connecting the conductor wires of one cable with those of another or others. The distribution frame may be of the construction of a frame referred to as a "module" in U.S. Pat. No. 4,278,315, granted July 14, 1981 and entitled "System For Interconnection Of Multiple Insulated Wires" in the name of B. T. Osborne. These connectors are normally of a construction referred to as "cross-connect connectors" in that each connector comprises a dielectric body with two spaced rows of electrical terminals held by the body. The terminals of one row are interconnected electrically and in desired fashion with those of the other row through the dielectric body. The construction of cross-connect connectors may be as referred to as "connector blocks" in U.S. Pat. No. 4,295,703, granted Oct. 20, 1981 and entitled "Connector Block" in the name of B. T. Osborne.

According to normal practice, at each distribution frame, an incoming cable is brought into an input location of the frame and its conductor wires are distributed as required to the various positions for mounting the cross-connect connectors. Each connector is then connected to its associated wires of the incoming cable with the connector mounted in the frame. The wires of the incoming cable are connected with the connector mounted in a position reversed from its operational position to allow these wires to be joined to terminals along one row. The connector is then removed and reinstated in its correct operational position to allow conductor wires of an outgoing cable to be connected to the terminals of the other row. The whole of the connection procedure is manual and is an arduous and lengthy process particularly as there may be as many as twenty-five terminals along each row of a connector and some distribution frames have ten or more connectors. The finished assembly of wires of an incoming cable and an outgoing cable is described in U.S. Pat. No. 4,278,315 referred to above.

The present invention basically provides a connector body and a connector assembly which in use simplify the installation of incoming cables or wiring and the interconnection with outgoing cables or wiring to equipment which is close by, such equipment being for instance, end use equipment, such as telephones and data processing terminals. The invention also reduces the amount of time necessary for cables or wiring to be connected to the terminals of the connector assembly. In essence, the invention provides a connector body or assembly which may be installed in a distribution frame and which is provided with a modular jack housing defining a plurality of holding means for plug retainers of modular jacks and associated plugs. With this construction, plug retainers may be mounted into the modular jack housing with conductor wires connected to the plug retainers from a connector of the assembly before the assembly is actually mounted in operative position, e.g. within the distribution frame.

According to one aspect, the present invention provides a connector assembly comprising a dielectric body providing a modular jack housing defining a plurality of holding means, each for a plug retainer for a modular jack and for an associated plug, and a connector element providing terminals for electrical connection to incoming transmission wires and of sufficient number to be connected to plug retainers for said plurality of holding means.

Preferably, the dielectric body has first and second body portions and two spaced rows of electrical terminals held by the first body portion with the terminals of one row electrically connected through the first body portion with terminals of the other row to provide the connector element, the second body portion providing the modular jack housing.

In a preferred arrangement, the first body portion is a planar portion with two edge regions, the two rows of terminals positioned along each edge region and the second portion extends laterally from the planar portion. It is also a preferred practical construction that the holding means lie in series along the second body portion in a line substantially parallel with the plane of the first portion. Ideally, the holding means are orientated to enable each row of terminals to face in a specific direction away from the body and for plugs to be inserted into the holding means by movement of the plugs in a direction opposite to said specific facing direction of one terminal row and to be removable from the holding means by plug movement in the specific facing direction.

Thus when the assembly is mounted within a distribution frame with said one row of terminals accessible for connecting conductor wires to the terminals, then the plugs also may be inserted and removed.

The invention further includes a connector assembly as defined according to the invention provided with a plurality of plug retainers for insertion in said plurality of holding means, the plug retainers being electrically connected by insulated conductor wires to terminals of one of the rows.

With plug retainers held in the connector assembly in this fashion, this allows for ease of assembly of wiring and equipment which may be performed independently of the mounting of the connector assembly into a distribution frame so that assemblies including plug retainers may be stored ready for use. In addition to this of course, as the number of wires to be connected into the connector assembly is reduced when the assembly is in operative position, e.g. within a distribution frame, the amount of time required in rendering such connector assemblies operative is reduced as compared to that for conventional cross-connect connectors.

According to another aspect, the invention provides a connector body providing a modular jack housing defining a plurality of holding means, each for a plug retainer for a modular jack and for an associated plug, and means for mounting a part of a mating connector onto the body.

In a practical arrangement, a connector assembly includes the connector body defined above and also has a part of a mating connector and a plurality of plug retainers, the part of the connector secured to the mounting means and having terminals connected by electrical wiring to the plug retainers.

Embodiments of the invention will now be described, by way of example, with reference to the accompanying drawings, in which:

FIG. 7 is a view of the connector assembly of the first embodiment in the direction of arrow VII in FIG. 5;

FIG. 8 is a view of the connector assembly of the first embodiment in the direction of arrow VIII in FIG. 6;

Figure 5:
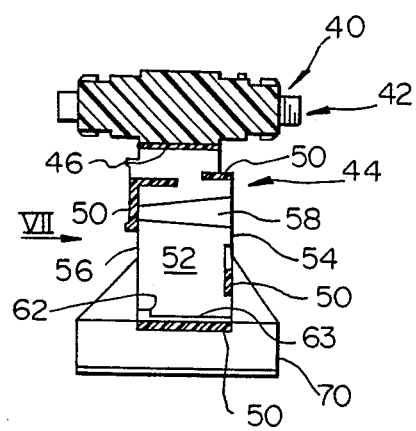
FIG. 5 is a cross-sectional view through a connector assembly according to a first embodiment.
Figure 10:
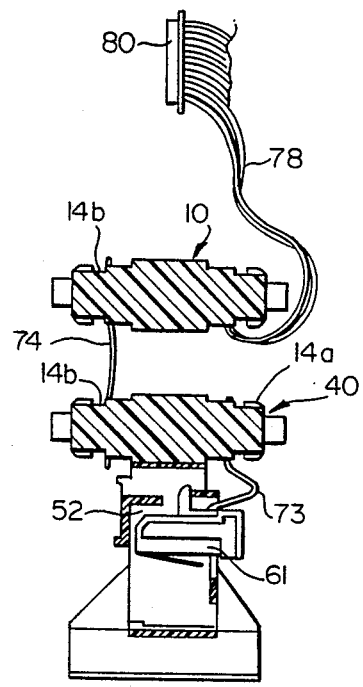
Figure 11:
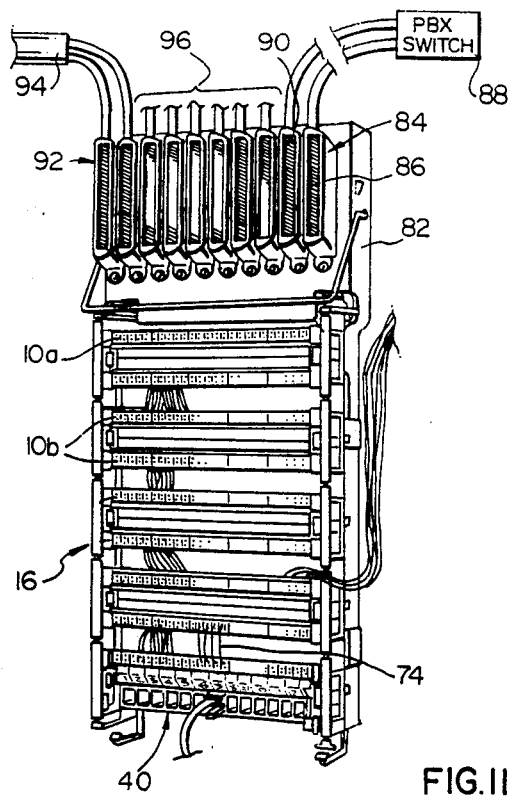
Figure 12:
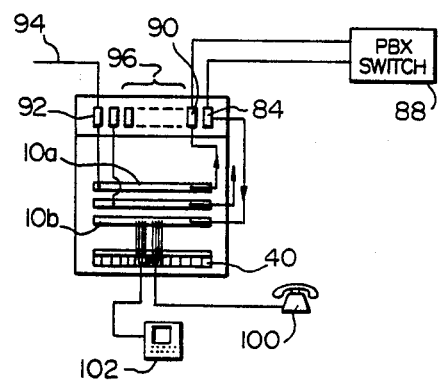
Figure 13:
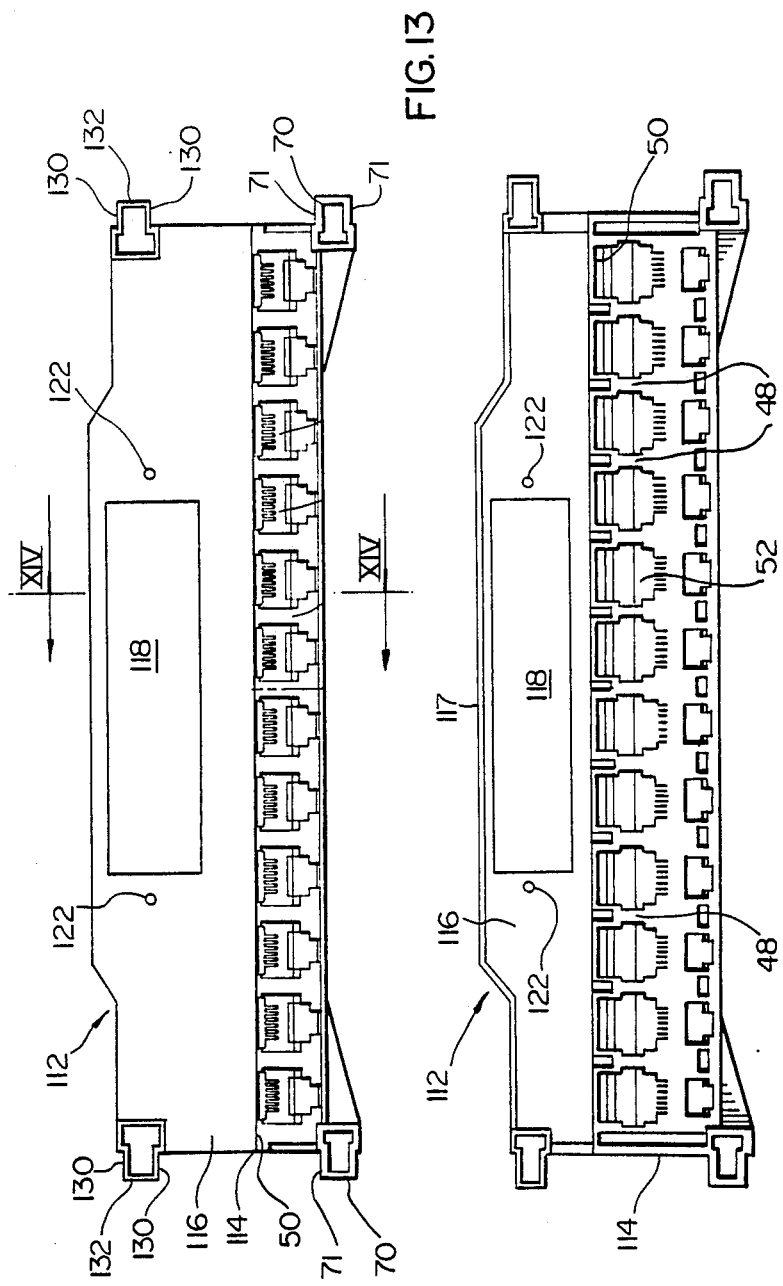
Figure 14:
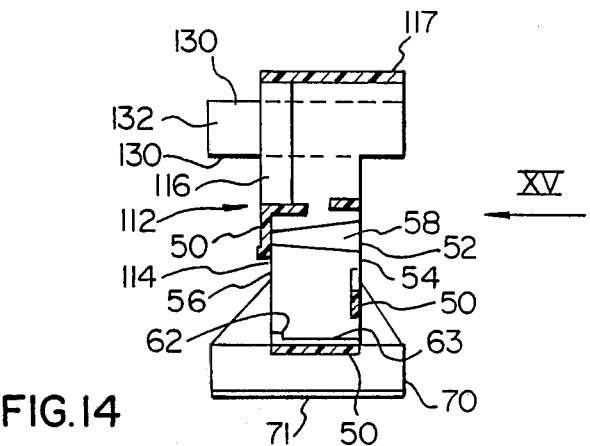
Figure 16:
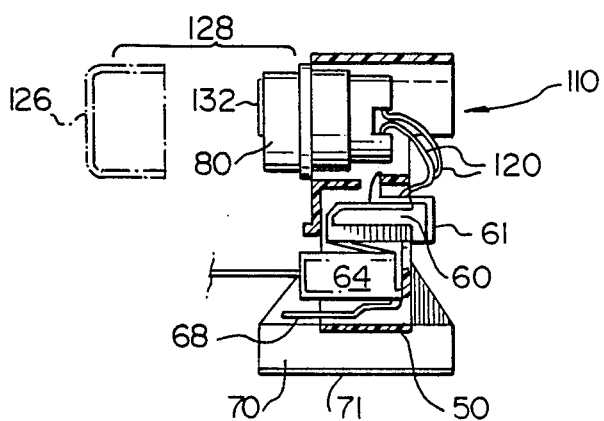
Figure 19:
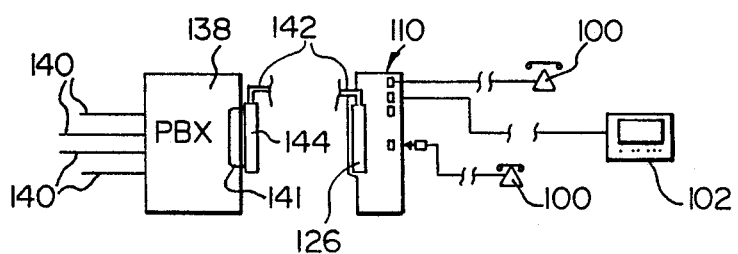
Figure 17:
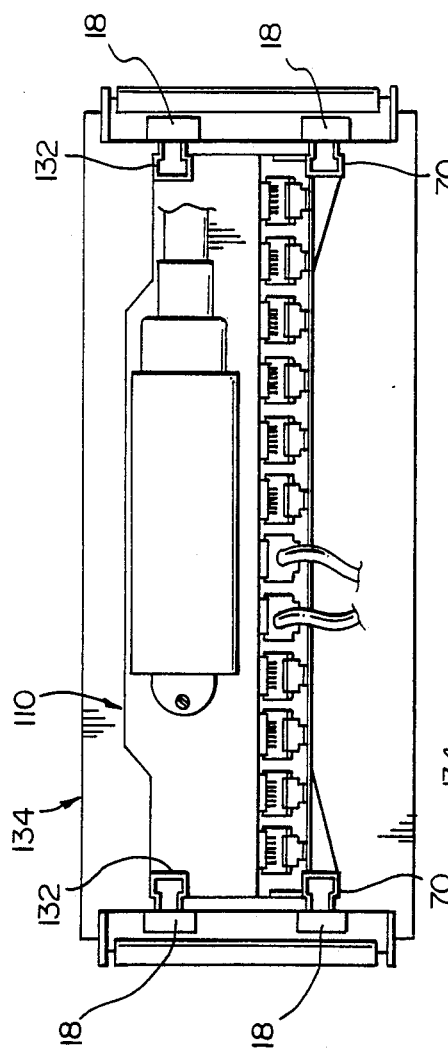
Figure 18:
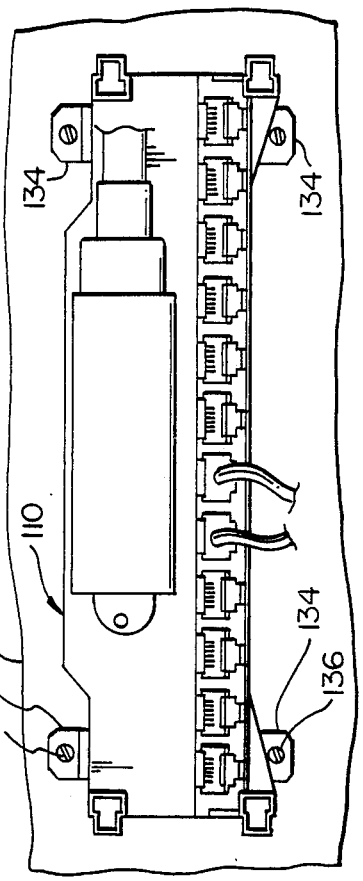

FIG. 10 relates to a second embodiment and is a cross-sectional view of the connector assembly of FIG. 5 as wired in a distribution frame (not shown) of the second embodiment;

FIG. 11 is an isometric view of the distribution frame of the second embodiment, with the connector assembly and wiring of FIG. 10;

FIG. 12 is a diagrammatic view of wiring associated with the assembly of FIG. 11 and associated apparatus;

FIG. 13 is a front view of a connector body according to a third embodiment;

FIG. 14 is a cross-sectional view through the connector body taken along line XIV—XIV in FIG. 13;

FIG. 15 is a rear view of the connector body taken in the direction of arrow XV in FIG. 14;

FIG. 16 is a view similar to FIG. 14 of a connector assembly incorporating the connector body of the third embodiment;

FIG. 17 is a front view of the connector assembly of FIG. 16 and showing the assembly mounted into a distributor frame;

FIG. 18 is a view similar to FIG. 17 showing an alternative method of mounting the assembly into an operative position; and FIG. 19 is a diagrammatic view of wiring associated with the assembly of FIGS. 15 and 16 and associated apparatus.

Figure 1:
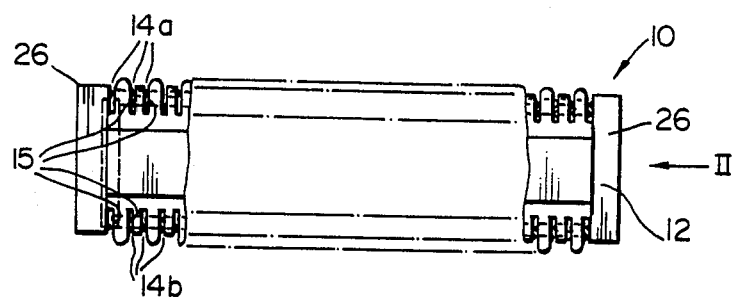
FIG. 1 is a plan view of a prior construction of a cross-connect connector.
Figure 2:
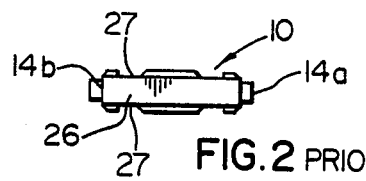
FIG. 2 is an end view of the prior connector in the direction of arrow II in FIG. 1.

As shown in FIGS. 1 and 2, a prior cross-connect connector 10 comprises a substantially planar body 12 of dielectric material having along each edge a row of terminals 14a and 14b. In this known connector structure, each of the terminals comprises two opposed electrically conductive portions (not shown) arranged on either side of a molded groove 15 in an edge of the body 12. These conductor portions act to cut into insulating material surrounding a conductor wire when the wire is forced into the groove so that the conductor portions electrically contact the conductor wire. Such terminals are normally referred to as insulation displacement terminals. This cross-connect connector structure is used for the distribution of electrical wiring to access points and terminals within a customer's premises. In this structure, terminals of one row, e.g. terminals 14a, are connected to conductor wires of one cable or group of cables and terminals of the other row of terminals, e.g. terminals 14b, are connected to another cable or group. An example of the prior cross-connect connector is described in U.S. Pat. No. 4,295,703, granted Oct. 20, 1981 and entitled "Connector Block" in the name of B. T. Osborne.

Figure 3:
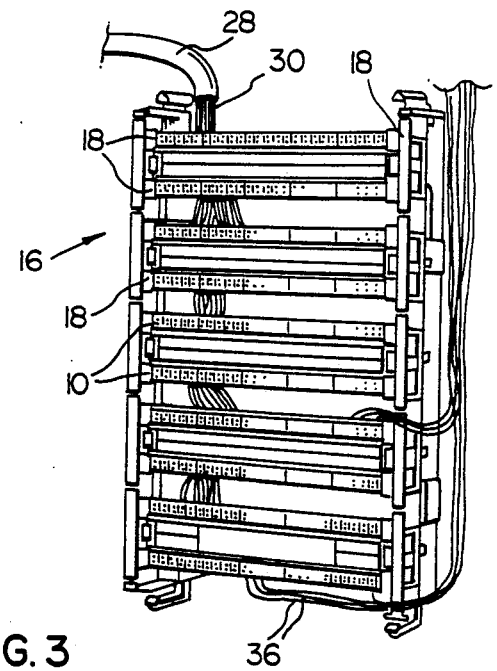
FIG. 3 is an isometric view of a distribution frame and cross-connect connector assembly according to the prior art.
Figure 4:
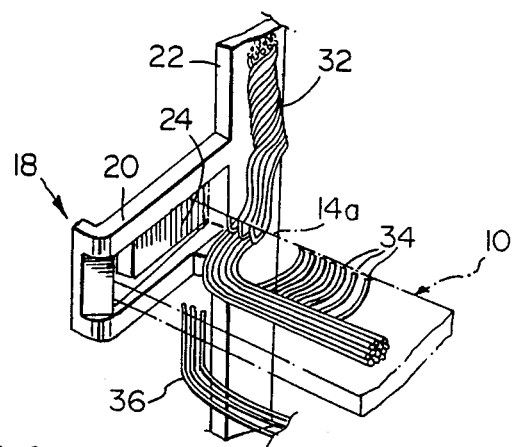
FIG. 4 is an isometric view, on a larger scale, of part of the assembly of FIG. 3 to show wiring to a prior cross-connect connector.

The cross-connect connector 10 as shown in FIG. 1, is normally used in a prior art distribution frame arrangement and wiring assembly, an example of which is shown in FIG. 3. A distribution frame and wiring assembly, as shown in FIG. 3, comprises a distribution frame 16 having a plurality of mounting means for detachably holding a plurality of cross-connect connectors 10 in predetermined locations. As can be seen, FIG. 3 shows a typical distribution frame having ten mounting means, each of which comprises a pair of aligned and spaced parts 18. Each of the parts 18 comprises, as shown in FIG. 4, a resilient horizontal latch 20 standing forwardly from an integral vertical support 22. The latches lie parallel in an unstrained position. As shown in FIGS. 1 and 2, the cross-connect connector has two ends 26 which define upper and lower and end rail surfaces 27 for acceptance within a slot of a latch 20 and for engaging a stop 24 lying outside the slot. As the cross-connect connector is fitted between the two parts of the mounting means in the distribution frame, the latches are forced apart to allow entry, then the ends 26 slide into the slots and engage the stops 24.

Cross-connect connectors are carried in the above fashion in horizontal positions and are tiered one above another as shown in FIG. 3. In the finished assembly of the distribution frame and wiring according to the prior art, an incoming cable 28 has its insulated conductor wires 30 separated into groups and these groups are passed to the cross-connect connectors, one group to each connector. As may be seen from FIG. 4, each group 32 of insulated conductor wires passes beneath the associated cross-connect connector 10 with the ends 34 of the conductor wires extending in succession away from the group to be held within the terminals of the terminal row which lies at the back edge of the conductor, e.g. terminal row 14a. Other conductor wires 36 (FIG. 4) are connected to the terminals of the forward row of the connector (e.g. terminal row 14b) and these conductor wires are outgoing conductor wires to other distribution frames, switches, or end use terminals as required. This wiring arrangement is also shown in U.S. Pat. No. 4,278,315, granted July 14, 1981 and entitled "System For Interconnection Of Multiple Insulated Wires" in the name of B. T. Osborne.

Thus the connector ends 34 and 36, the incoming cable 28 and any outgoing wires or cables are permanently attached to the connectors at the distribution frame. Also the conductor wires need to be connected to their respective terminals with the connectors 10 already mounted in the distribution frame. This is effected in known manner by locating the connectors initially in a reverse position from their normal operating position and then in their normal operating position to enable the conductor wire ends to be inserted into the terminals along each row in turn. For instance, to enable the cable 28 to be connected to a connector 10, the connector is initially in a reversed position with the terminals 14a facing forwardly of the distribution frame as distinct from facing rearwardly as shown in FIG. 4. This enables the associated group 32 of wires to be connected along the row 14a of terminals. The connector is then removed from the mounting means of the distribution frame and is reversed. This reversal places the connector in its final operating position as shown in FIG. 4 with the terminals 14b facing forwardly and also with the group 32 of conductor wires lying beneath the connector as shown. The terminals 14b are then connected to the wires 36 as access from the front of the distribution frame is then possible. Thus a lengthy assembly procedure of wires and connectors and distribution frame is necessary and, because of the possible location of the incoming or outgoing cables or wires, and the location of the distribution frame itself, then the assembly of the wires into the connectors may be a difficult operation for the assembler.

With the present invention however, the above disadvantages are avoided or minimized.

In a first embodiment as shown in FIG. 5, a connector assembly 40 comprises two body portions. A first body portion 42 is of the same construction as the whole of a prior art cross-connect connector 10 as shown in FIGS. 1 and 2. A second body portion 44 of connector assembly 40 is provided as a separate plastics structure which is mounted by adhesive on one side surface of the body portion 42 so that it extends laterally of the plane of the body portion 42. The second body portion 44 has a planar side 46 which is adhesively secured to the portion 42. From the side 46 extends a modular jack housing 47 which defines a plurality of holding means for modular jack plug retainers and plugs. As shown in FIGS. 5, 6, 7 and 8, the holding means of the modular jack housing are defined partly by a plurality of walls 48 which extend in parallel and spaced apart relationship from the planar side 46. The holding means are also partly defined by other walls 50 which extend longitudinally of the connector assembly and parallel to the portion 42, to provide a plurality of modular jack receiving chambers 52. As can be seen from FIGS. 8 and 9, these chambers lie in side-by-side relationship in series in a line substantially parallel with the plane of the first body portion 42. As shown by FIG. 5, each chamber 52 has two opposite ends with each end having an opening, one opening 54 for receiving a plug retainer and the other opening 56 for receiving the plug. Each side of each wall 48 is profiled with a tapered recess 58 for sliding reception of a guide projection 60 of a plug retainer 61 (see FIG. 6). Each wall 48 is also formed with a laterally extending projection at its lower end, the projection being formed with a step 62 forming an abutment for retaining the plug 64 in position after passage of the plug through the aperture 56. A resilient release finger 68 of the plug engages behind step 62 in the assembled position of the plug. Both the plug and plug retainer are of conventional construction and need be described no further. The method of attachment of the plug is also similar to that for its attachment into a conventional wall housing for a modular jack.

Apart from the rail surfaces provided at the ends 26 of the first body portion of the connector assembly, the connector assembly is also provided with two ends 70 with rail surfaces 71 on the second body portion. These ends 70 are spaced apart substantially the same distance as the ends 26 and have substantially the same outside shape and profile as the ends 26. The distance apart of the ends 26 and 70 is such that a connector assembly 40 can be mounted into a conventional distribution frame while the ends 26 and 70 are received within two different and vertically spaced mounting means of the distribution frame and which would normally be used to accept two conventional cross-connect connectors.

Figure 6:
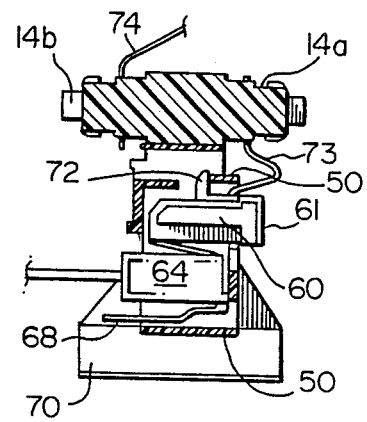
FIG. 6 is a view similar to FIG. 5 showing the connector assembly fitted with a plug retainer and plug.

In use, the connector assembly 40 is fitted with a plug retainer 61 of a modular jack in some and possibly all of the chambers 52 by reception of the retainers through the openings 54 into the chambers. FIG. 6 shows the position of such a retainer in one of the chambers and FIG. 8 also illustrates one plug retainer in position within a chamber. The plug retainers are held in position by reception of a retaining projection 72 which latches against an abutment surface of one of the walls 50. Also as shown in FIGS. 6 and 9, each of the plug retainers is connected by conductor wires 73 to appropriate terminals of one of the rows, e.g. terminals 14a, to make a pre-assembly for attachment into a distribution frame.

Figure 9:
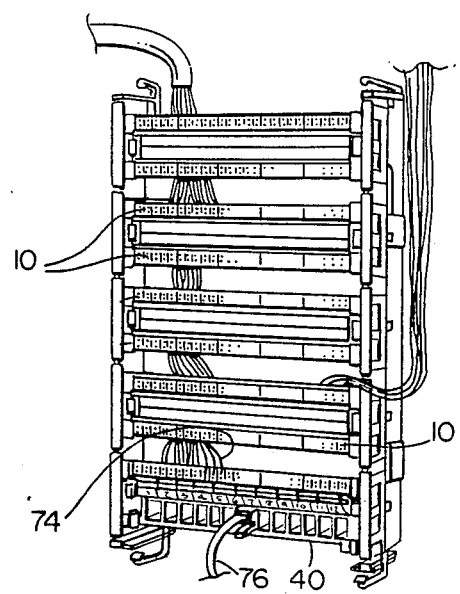
FIG. 9 is a view similar to FIG. 3 of a distribution frame and connector assembly which incorporates a connector assembly of the first embodiment.

As shown in FIG. 9, a distribution frame 16 of the first embodiment is basically similar in construction to that described with regard to FIG. 3 and it is provided with eight upper cross-connect connectors 10 of conventional construction. However the lowest two mounting means carry the connector assembly 40 by location of the ends 26 (FIG. 7) within the upper of these two mounting means and the ends 70 (FIG. 7) within the lower of the mounting means. This is the situation shown in FIG. 9. Obviously more than one connector assembly 40 can be assembled into the distribution frame dependent upon the requirements.

As can be seen from the above description, particularly with reference to FIGS. 6 and 9, with the connector assembly 40 already electrically connected along its one row of terminals (i.e. terminals 14a) to the plug retainer, then the connection of conductor wires into these terminals with the connector assembly mounted on the frame is totally avoided. In contrast, connector assemblies 40 can be pre-assembled and stored with the plug retainers already in position and for use upon distribution frames. Hence each connector assembly 40 may be located directly in operative position, as shown in FIG. 9, without any need to reverse it. Upon location in position, it is then necessary to connect the forward facing row of terminals, i.e. the row 14b, to a forward facing row of terminals of a cross-connect connector mounted in the frame. In this case, as shown in FIG. 9, the terminals of the connector assembly 40 are connected by insulated electrical conductor wires 74 to a cross-connect connector 10, e.g. as shown, directly above it. Only a few of the wires 74 are depicted for clarity in FIG. 9.

In use, it is a relatively simple matter to connect end use terminals which are relatively close to the distributor frame, i.e. in the same or adjacent rooms. This is performed by taking an electric cable 76 leading directly from the local terminal (e.g. a telephone or data processing equipment) and fitted with a plug 64 suitable for a modular jack. The plug is inserted through an opening 56 of the appropriate chamber 52 of the connector assembly 40. This procedure avoids the conventional method of attachment of terminal equipment to a distributor frame by permanently connecting wires of a cable to one of the conventional cross-connect connectors and passing the wire in a fixed position around a room to a location directly adjacent to the terminal itself. The present invention as exemplified by the above embodiment enables the equipment to be moved around the immediate area into any desired location while the plug will still be available for insertion into the connector assembly 40.

In a second embodiment as shown in FIGS. 10 and 11, a connector assembly 40 is of the construction shown in FIG. 5 and has a plug retainer 61 located in each required chamber 52 and connected by wiring 73 to the row 14a of terminals. The other row 14b of terminals is connected by other wires 74 to a row 14b of terminals of a cross-connect connector 10 as in the first embodiment. The row 14a of terminals of connector 10 is connected by a group of conductor wires 78 to a part 80 of a mating connector. FIG. 10 diagrammatically shows the connector and wiring arrangement, the distribution frame 16 (not shown) for clarity. This mating connector 84 (FIG. 11) is of conventional construction and comprises male and female parts and is commonly referred to as a "ribbon connector".

With the wires 78 of sufficient length, and with the connector 10 and connector assembly 40 disposed in any desired position within the distribution frame 16, the part 80 of the ribbon connector is attached to a panel 82 which is secured to the top of the distribution frame. As shown in FIG. 11 and as represented by FIG. 12 which shows the basic circuitry, the female connector part 80 of the right-hand end ribbon connector 84 is that to which the conductor wires 78 are attached. The male part 86 of this connector extends to the private branch exchange 88 and this is also connected to another ribbon connector 90 which in turn has wires connected with one row of terminals of another conventional cross-connect connector 10a mounted in the distribution frame. This connector is also connected by its other row of terminals with a female part of another ribbon connector 92. The complementary male part of the connector 92 is attached to conductor wires of an incoming cable 94.

The panel 82 is also provided with other ribbon connectors 96 across its width. Some of these connectors may be connected either to the cable 94 or to other equipment and are in turn connected to a row or rows of terminals of other cross-connect connectors 10b mounted in the distribution frame. However this part of the circuitry is of no concern to the present invention.

As shown by FIG. 12, end use terminals such as a telephone 100 and a data processing terminal 102 are connected directly by modular jacks into the connector assembly 40.

As is shown from the above embodiments, it is a simple matter to pre-construct the wiring arrangement between a row of terminals of the first body portion of the connector assembly and plug retainers for insertion in the holding means of the modular jack housing for the purpose of simplifying the wiring in a distribution frame itself.

It is possible to use the above embodiments of the invention not only for end use terminals but also for the purpose of connecting other equipment to connector assemblies through modular jacks. For instance, a connector assembly 40 could be mounted in the distribution frame and connected directly to a private banch exchange through a modular jack or jacks instead of through a ribbon type connector as shown in FIG. 12.

In a third embodiment, a connector assembly 110 (FIG. 16) is particularly useful where it is convenient to have it individually mounted and separate from a large distribution frame such as the frames 16 described above.

In this embodiment, parts of substantially the same structure as in the first embodiment, bear the same reference numerals.

The connector assembly 110 comprises a connector body 112 (FIGS. 13, 14 and 15) molded from dielectric plastics material and which comprises a modular jack housing 114 having a plurality of holding means for modular jack plug retainers and plugs, the holding means being of the structure described in the first embodiment. These holding means, i.e. the chambers 52, extend in series along the body.

The body also comprises a means for mounting a part of a mating connector onto the body. This mounting means comprises a web 116 of the body which extends laterally of the series of holding means. The web 116 has a front surface lying in the plane of the front surface of the remainder of the body (FIG. 14). Also, it is formed with a rectangular aperture 118 oriented with its major axis substantially parallel to the direction of the series of holding means, the aperture provided for receiving the rear section of part of a mating connector when this is mounted upon the front surface of the body. This part is a female part 80 of a ribbon connector (FIG. 16). Screw-threaded holes 122 are provided in web 116 for acceptance of screws to mount the connector part 80 onto the web. The web is strengthened by a rearwardly projecting flange 117 which is molded integrally with it.

As shown by FIG. 16, with the female connector part 80 secured in position as part of the connector assembly, the part 80 is accessible from the front of the body (i.e. left-hand side in FIG. 16) for the complementary connector part 126 to be connected to it (the part 126 shown chain-dotted), thereby completing the mating connector 128. Also, the apertures 56 are accessible from the front of the body for insertion and release of plugs 64.

In the assembled form, conductor wires 120 are connected to the connector part 80 and to plug retainers 61 which are detachably insertable into appropriate chambers 52 of the modular jack housing 114.

The body is provided with first rail surfaces 71 on ends 70 for acceptance within aligned parts of a first mounting means of a distribution frame. Laterally of the longitudinal direction of the series of holding means from the first rail surfaces are disposed second rail surfaces 130 formed upon ends 132 located with aperture 118 between them.

The connector assembly 110 is mountable upon an individual distribution frame 134 (FIG. 17) which is of the construction of the distribution frame 16, but is shorter as it is provided with only two mounting means, each of which comprises a pair of aligned and spaced parts 18. Each part 18 is constructed as described above and coacts with one of the ends 70 and 132 to mount the assembly 110 in position.

In an alternative arrangement as shown by FIG. 18, in which the assembly 110 may be mounted directly upon a wall 112, the assembly is provided with four spaced right angle brackets 134 secured to the body for passage of screws 136 to hold the assembly to the wall.

In use, the connector assembly 110 may be individually located and connected between a private branch exchange 138 and end use terminals such as telephones 100 and data processing terminals 102. This is shown in FIG. 19. The assembly 110 may therefore be located in any convenient position between the exchange and the terminals and the location convenience is to be compared with the location of the connector assembly 40 in the distribution frame 16 together with connectors 10a and 10b. The exchange 138 is connected by wiring or cable 140 on one side to cross-connect connectors mounted in a distribution frame (both not shown), this distribution frame possibly being of the structure described above with regard to the prior art. On the other side, the exchange is connected to the assembly 110. For this purpose, the exchange 138 is electrically wired to a mating connector part 141 of a ribbon connector mounted upon the exchange. A cable 142 is then wired at one end to a connector part 144 of the ribbon connector for connection to part 141. At its other end, the cable 142 is attached to connector part 126 for connection to part 80 of assembly 110. The assembly 110 is then easily connectible and disconnectible from the exchange for maintenance and use purposes by connecting and disconnecting the connectors at one or both ends of the cable.

As may be seen, with the assembly 110 in pre-built condition with the plug retainers electrically connecting the connector part 80 with the plug retainers, assembly of the parts to complete the circuit is a simple operation. The simplification is assisted by the use of the easily connected, pre-connectionized cable 142 and by the ready accessibility for directly connecting the end use terminals 100 and 102 to the assembly 110 by the plugs 64. The assembly 110 may thus be quickly and easily placed in and removed from a circuit with end use equipment and private branch exchanges. The assemblies 110 may also be stored ready for use thereby reducing the time required for completion of telecommunications circuitry compared to when conventional cross-connect connectors are used.

What is claimed is:

1. A connector comprising an elongate dielectric body provided by first and second body portions in which:
   the first body portion is planar and elongate and has two elongate sides and two opposite edges extending between the sides, the first body portion carrying a first row and a second row of insulation displacement terminals positioned one row along each side of the first body portion with the terminals of one row electrically interconnected with the terminals of the other row through the first body portion; and
   the second body portion projects outwardly from one of the elongate sides of the first body portion and extends along the length of the first body portion, the second body portion have two oppositely facing elongate sides which face laterally of the length of the first and second body portions, one of said elongate sides having a first series of openings spaced apart along said one side to receive plug retainers for modular jacks and other side having a second series of openings spaced apart along said other side for receiving plugs for the modular jacks, the first series of openings facing laterally of the body in the same direction as the first row of terminals and each opening of the first series interconnecting through the second body portion with a corresponding opening of the second series.

2. A connector according to claim 1 wherein the first body portion has end regions formed with rail surfaces for acceptance within aligned parts of a first mounting means of a distribution frame and the second body portion has two end regions with rail surfaces for acceptance within aligned parts of a second mounting means of the distribution frame.

3. A connector assembly comprising a connector according to claim 1 provided with a plurality of plug retainers for insertion in said first series of openings, said plug retainers electrically connected by insulated conductor wires to terminals of the first row.

4. An assembly according to claim 3 mounted within a distribution frame with the second series of openings accessible from outside the frame to enable plugs to be inserted into and removed from the second series of openings.

* * * * *